United States Patent
Di Gennaro

(10) Patent No.: US 7,128,060 B2
(45) Date of Patent: *Oct. 31, 2006

(54) DEVICE FOR EXPANDING LIQUEFIED GAS WITH SEPARATE VAPORIZING ELEMENT

(76) Inventor: Antoine Di Gennaro, 17 avenue Général Pruneau, F-83000, Toulon (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/486,194

(22) PCT Filed: Dec. 20, 2000

(86) PCT No.: PCT/FR00/03609

§ 371 (c)(1),
(2), (4) Date: Jul. 23, 2004

(87) PCT Pub. No.: WO02/50416

PCT Pub. Date: Jun. 27, 2002

(65) Prior Publication Data

US 2004/0250798 A1 Dec. 16, 2004

(51) Int. Cl.
*F02M 53/02* (2006.01)
(52) U.S. Cl. .................................... 123/527
(58) Field of Classification Search ............... 123/525, 123/527, 529, 196 S, 27 GE, 575
See application file for complete search history.

(56) References Cited

U.S. PATENT DOCUMENTS

| | | | | |
|---|---|---|---|---|
| 4,416,638 A | * | 11/1983 | Ellis | .................... 440/88 R |
| 4,492,208 A | | 1/1985 | Lent | |
| 4,528,966 A | | 7/1985 | Lent et al. | |
| 4,768,492 A | | 9/1988 | Widmer et al. | |
| 4,858,583 A | | 8/1989 | Sonntag | |
| 4,865,004 A | | 9/1989 | Widmer et al. | |
| 4,875,439 A | | 10/1989 | Widmer et al. | |
| 5,367,999 A | * | 11/1994 | King et al. | .................... 123/458 |

FOREIGN PATENT DOCUMENTS

| | | |
|---|---|---|
| CH | 552185 | 7/1974 |
| DE | 2613175 | 10/1977 |
| DE | 3612994 | 10/1987 |
| EP | 0026017 | 4/1981 |
| EP | 0611588 | 8/1994 |
| EP | 0685639 | 9/1997 |
| EP | 0852348 | 7/1998 |
| EP | 1016782 | 7/2000 |
| FR | 2422832 | 11/1979 |
| FR | 2757217 | 6/1998 |

(Continued)

*Primary Examiner*—Stephen K. Cronin
*Assistant Examiner*—Hyder Ali
(74) *Attorney, Agent, or Firm*—Greenblum & Bernstein, P.L.C.

(57) ABSTRACT

Arrangement for expanding liquefied gas. The arrangement includes a vaporizing element having a heat exchanger. The heat exchanger has an impermeable enclosure containing a heating fluid and a vaporizing tube made of a heat conducting material through which the liquefied gas passes. The vaporizing tube includes an intake connected to a supply reservoir and an outlet supplying vaporized gas. An element is provided for regulating a flow rate and a pressure of vaporized gas. A tube connects the outlet of the vaporizing tube to the element for regulating a flow rate and a pressure of vaporized gas. The element for regulating a flow rate and a pressure of vaporized gas is connected to an engine. This Abstract is not intended to define the invention disclosed in the specification, nor intended to limit the scope of the invention in any way.

15 Claims, 2 Drawing Sheets

FOREIGN PATENT DOCUMENTS

| | | |
|---|---|---|
| FR | 2759419 | 8/1998 |
| FR | 2787515 | 6/2000 |
| FR | 2801643 | 6/2001 |
| WO | WO 9504213 A1 * | 2/1995 |
| WO | 97/47872 | 12/1997 |

* cited by examiner

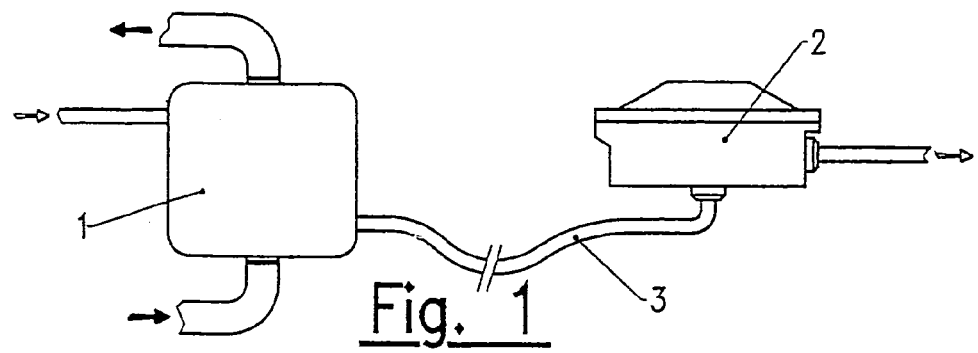
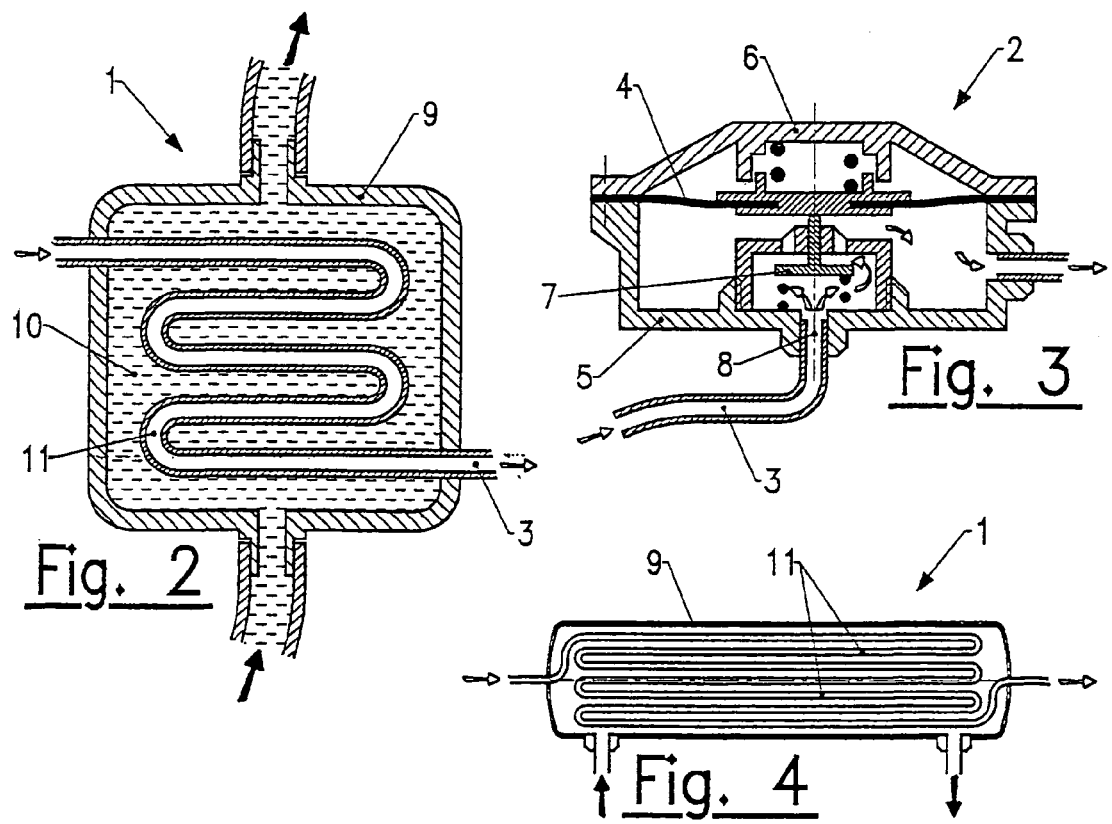
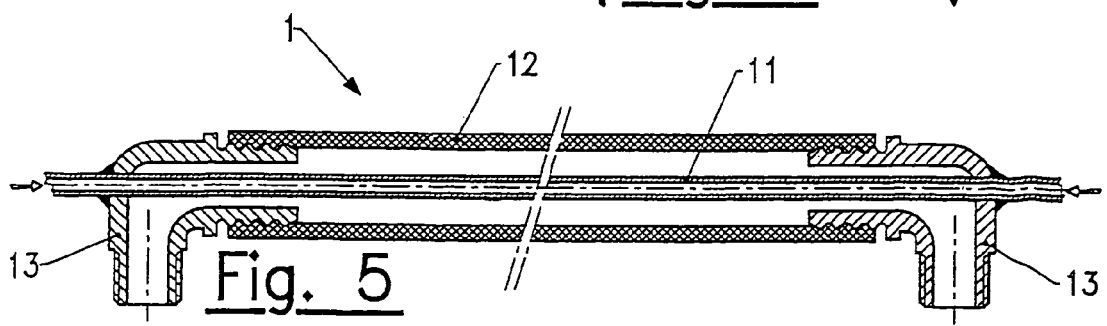

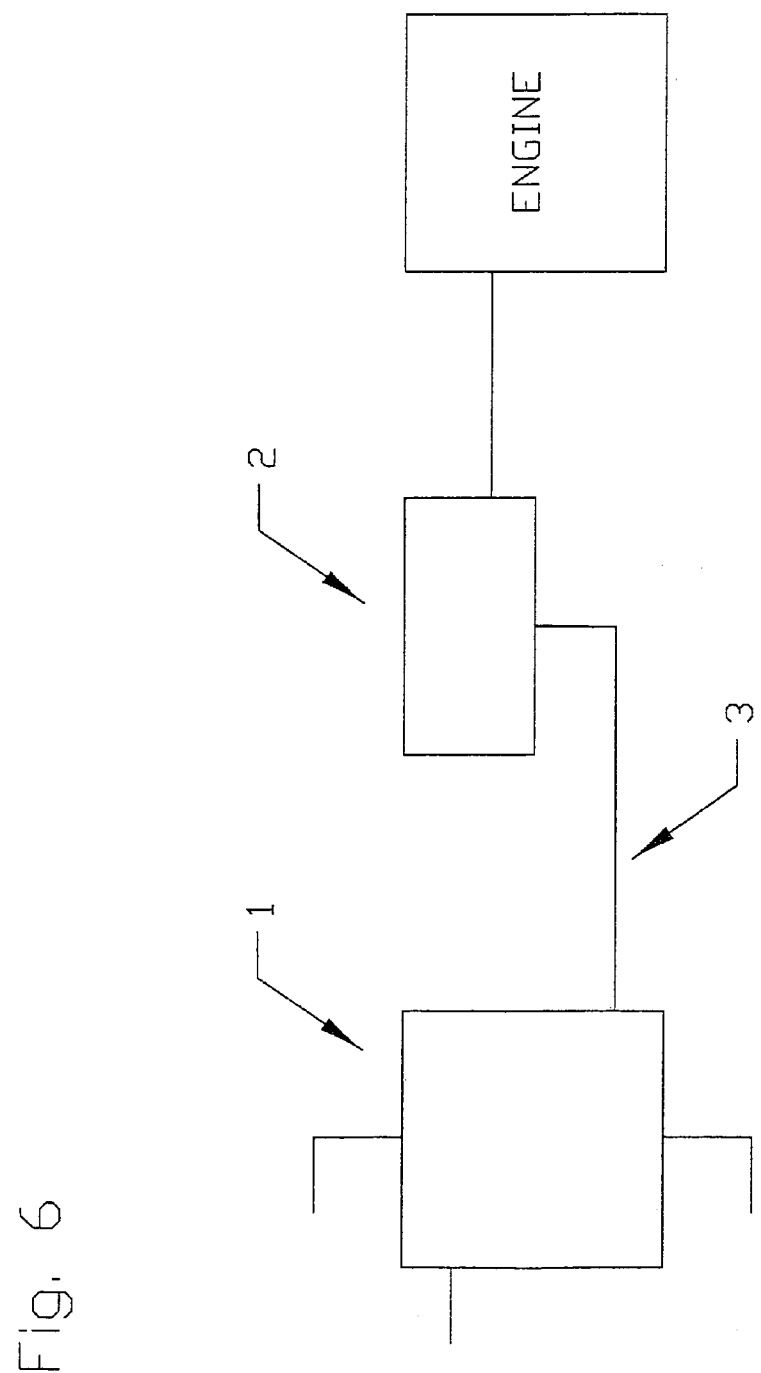

DEVICE FOR EXPANDING LIQUEFIED GAS WITH SEPARATE VAPORIZING ELEMENT

CROSS-REFERENCE TO RELATED APPLICATIONS

The instant application is a U.S. National Stage Application of International Application No. PCT/FR00/03609 filed on Dec. 20, 2000 and published as International Publication WO 02/50416 on Jun. 27, 2002.

BACKGROUND OF THE INVENTION

1. Field of the Invention

The present invention is directed to a device for expanding liquefied gas with a separate vaporizing element.

The invention provides for an arrangement which allows the supply of liquefied petroleum gas (L.P.G.) for use in ignition engines normally receiving a liquid fuel.

It is suitable for all types of internal combustion engines, and it is adapted in particular to boat engines.

2. Description of the Prior Art

Liquefied petroleum gas is used more and more as a source of energy for motor vehicles. Indeed, this fuel has very interesting advantages, chief among which a very low pollution must be listed, and an advantageous charge rate used by numerous countries, allowing a substantial decrease in the kilometric cost.

The use of liquefied gas to operate an engine which was initially designed to receive a liquid fuel requires using a specific device ensuring the vaporization of the gas under a predetermined pressure and flow rate.

This device is usually in the form of a housing, generally made of a light metal cast iron, such as aluminum, and comprising a double enclosure formed of a gas vaporizing chamber and a thermal chamber in which a hot liquid circulates, which is most often constituted by the engine cooling water drawn due to a shunt made on the circuit connecting the latter to the radiator, or to the evacuation pipeline in the case of boat engines cooled with sea water. The two chambers have a common wall arranged to allow for the transmission of calories.

The vaporizing chamber also acts as a pressure regulator and, to this end, comprises a valve that is generally activated by an internal membrane.

The design of this system causes a certain number of drawbacks.

Given that the transfer of heat occurs through the wall that is common to the two chambers, and that the other walls of the vaporizing chamber communicate with the outside, substantial losses of calories occur, and in order to obtain a right vaporization of the liquefied gas, manufacturers have to provide separation walls in the form of a labyrinth in order to increase the common surface, which obviously generates high manufacturing costs. Despite these arrangements, it is necessary in certain cases to provide an additional heating means, for example, an electrical resistance as the one described in the Patent No. FR 2 759 419, or an outer impermeable enclosure provided with a heat supply element and connected to the thermal chamber of the vaporizing housing by a double canalization in a closed circuit, as one in which circulates a fluid ensuring the transfer of the calories produced in the heated enclosure toward the vaporizer, this device being the object of the Patent Application No. FR 98 08 110.

Furthermore, the existing apparatuses do not allow supplying high powered engines and, in this case, one must provide several steam pressure regulators for a single engine.

SUMMARY OF THE INVENTION

The device according to the present invention aims to overcome these drawbacks. Indeed, it can be easily adapted to engines of all types and sizes, and it allows for a substantial decrease in the manufacturing costs due to the simplicity of its design, while ensuring an excellent heat exchange between the gas to be vaporized and the heating fluid.

It is formed of two independent parts linked by a single tube. The two parts are an element for regulating the flow rate and the pressure of the vaporized gas, connected to the engine, and a vaporizing element utilizing a heat exchanger constituted of a tube made of a heat conducting material in which the gas passes, liquid at the intake connected to the supply reservoir and gaseous at the outlet. The tube is immerged in the heating liquid that is itself contained in an enclosure made preferably of an insulating material.

The invention provides for an arrangement for expanding liquefied gas, wherein the device comprises a vaporizing element comprising a heat exchanger. The heat exchanger comprises an impermeable enclosure containing a heating fluid and a vaporizing tube made of a heat conducting material through which the liquefied gas passes. The vaporizing tube comprises an intake connected to a supply reservoir and an outlet supplying vaporized gas. An element is provided for regulating a flow rate and a pressure of vaporized gas. A tube connects the outlet of the vaporizing tube to the element for regulating a flow rate and a pressure of vaporized gas. The element for regulating a flow rate and a pressure of vaporized gas is connected to an engine.

The tube may be a single tube. The tube may be immerged in the heating fluid contained in an impermeable enclosure. The liquefied gas may comprise liquefied petroleum gas (LPG). The engine may comprise an internal combustion engine. The engine may comprise a boat engine. The element for regulating a flow rate and a pressure of vaporized gas may lack a thermal chamber. The element for regulating a flow rate and a pressure of vaporized gas may comprise a housing having a bottom, a cover and an intake, a flexible membrane arranged between the bottom and the cover, and a valve coupled to the intake. The valve may comprise a decelerating valve.

The impermeable enclosure may be made of an insulating material. The heat exchanger may comprise a tubular heat exchanger and the vaporizing tube may comprise a coil of substantial length arranged in a folded manner.

The impermeable enclosure may comprise a reinforced rubber tube having two ends, and angled connectors arranged on each of the two ends. The vaporizing tube may pass through each of the angled connectors.

The device may further comprise a low-voltage electric heating cord wound about the vaporizing tube.

The vaporizing element may further comprise a valve for stopping the liquefied gas. The valve may be arranged at the intake. The valve may be controlled by a pressure sensor.

The device may further comprise a system for controlling a flow rate of the heating fluid.

The vaporizing element may comprise a system for controlling a flow rate of the heating fluid. The system may be controlled by a temperature sensor.

The invention also provides for a method of supplying vaporized liquefied petroleum gas (LPG) to an engine using the arrangement described above, wherein the method comprises moving the heating fluid though the heat exchanger, moving the LPG from the supply reservoir to the intake and through the vaporizing tube, creating the vaporized LPG within the vaporizing tube, moving the vaporized LPG through the tube connecting the outlet of the vaporizing tube to the element for regulating a flow rate and a pressure of vaporized gas, regulating the flow rate and the pressure of the vaporized LPG, and delivering the vaporized LPG to the engine.

The invention also provides for a method of supplying vaporized liquefied petroleum gas (LPG) to a boat engine using the arrangement described above, wherein the method comprises moving the heating fluid though the heat exchanger, moving the LPG from the supply reservoir to the intake and through the vaporizing tube, creating the vaporized LPG within the vaporizing tube, moving the vaporized LPG through the tube connecting the outlet of the vaporizing tube to the element for regulating a flow rate and a pressure of vaporized gas, regulating the flow rate and the pressure of the vaporized LPG, and delivering the regulated vaporized LPG to the engine.

The invention also provides for a system for delivering vaporized LPG to an engine, wherein the system comprises a heat exchanger comprising an impermeable enclosure containing a heating fluid and a vaporizing tube made of a heat conducting material through which the LPG passes, wherein the vaporizing tube comprises an intake connected to a supply reservoir and an outlet supplying vaporized LPG, a regulating device for regulating a flow rate and a pressure of vaporized LPG, and a tube connecting the outlet of the vaporizing tube to the regulating device, wherein the regulating device is connected to the engine.

The invention also provides for a method of supplying vaporized liquefied petroleum gas (LPG) to an engine using the system described above wherein the method comprises moving the heating fluid though the heat exchanger, moving the LPG from the supply reservoir to the intake and through the vaporizing tube, creating the vaporized LPG within the vaporizing tube, moving the vaporized LPG through the tube connecting the outlet of the vaporizing tube to the regulating device, regulating the flow rate and the pressure of the vaporized LPG, and delivering the vaporized LPG to the engine.

The invention also provides for a method of supplying vaporized liquefied petroleum gas (LPG) to a boat engine using the system described above wherein the method comprises moving the heating fluid though the heat exchanger, moving the LPG from the supply reservoir to the intake and through the vaporizing tube, creating the vaporized LPG within the vaporizing tube, moving the vaporized LPG through the tube connecting the outlet of the vaporizing tube to the regulating device, regulating the flow rate and the pressure of the vaporized LPG, and delivering the vaporized LPG to the boat engine.

The invention also provides for a system for supplying vaporized LPG to a boat engine, wherein the system comprises a heat exchanger comprising an impermeable enclosure containing a heating fluid and a vaporizing tube made of a heat conducting material through which the LPG passes. The vaporizing tube comprises an intake connected to a supply reservoir and an outlet supplying vaporized LPG. A regulating device is provided for regulating a flow rate and a pressure of vaporized LPG. The regulating device comprises a housing which contains a flexible membrane and a valve. A tube connects the outlet of the vaporizing tube to the regulating device. The regulating device is connected to the boat engine.

The invention also provides for a method of supplying vaporized liquefied petroleum gas (LPG) to a boat engine using the system described above wherein the method comprises moving the heating fluid though the heat exchanger, moving the LPG from the supply reservoir to the intake and through the vaporizing tube, heating the LPG within the vaporizing tube with the heating fluid such that the vaporized LPG is created within the vaporizing tube, moving the vaporized LPG through the tube connecting the outlet of the vaporizing tube to the regulating device, regulating the flow rate and the pressure of the vaporized LPG, and supplying the vaporized LPG to the boat engine.

BRIEF DESCRIPTION OF THE DRAWINGS

In the attached schematic drawings, given by way of non-limiting example embodiments of the invention:

FIG. 1 shows the vaporizing element and regulating element assembly;

FIGS. 2 and 3 show, in cross-section, on a different scale, the vaporizing element and regulating element of FIG. 1, respectively;

FIGS. 4 and 5 show, also in cross-section, alternative embodiments of the vaporizing element; and FIG. 6 schematically illustrates an engine coupled to the regulating element.

DETAILED DESCRIPTION OF THE PRESENT INVENTION

The device, FIGS. 1–5, is constituted of a vaporizing element 1 and of an element 2 for regulating the pressure and the flow rate. These two elements are separate and connected by a tube 3 that can be a flexible tube.

The regulating element 2 is consistent with devices usually integrated in common steam-pressure regulators, but it is not provided with a thermal chamber. It essentially comprises a flexible membrane 4 engaged between the bottom 5 and the cover 6 of a housing and acting on a valve 7 arranged on the intake 8 of the gas originating from the vaporizing element 1. The regulating element 2 can be equipped with accessories (not shown) mounted on the known devices, such as a decelerating valve, or multiple chambers with different pressures.

The vaporizing element 1 utilizes a heat exchanger constituted of an impermeable enclosure 9 advantageously made of an insulating material and in which the heating fluid 10 circulates. A tube 11, preferably made of brass or of bronze, is immerged in this liquid and is connected to the reservoir of liquefied gas on one side and to the regulating element 2 on the other side. It is in this tube that the gas is vaporized, due to the calories supplied by the heating fluid 10.

The impermeable enclosure 9 and the vaporizing tube 11 can be of any form and arrangement.

In particular, according to a first alternative embodiment shown in FIG. 4, the vaporizing element 1 is constituted of a tubular heat exchanger of a known type with a vaporizing tube 11 folded over several times in order to form a coil of substantial length.

According to a second alternative embodiment shown in FIG. 5, the impermeable enclosure is constituted of a reinforced rubber pipe 12 of the DURITE® type through which the vaporizing tube 11 passes, and which is closed at its two ends by angled connections 13 traversed by the vaporizing tube. This arrangement allows easily adapting the features (length, diameter, curvature) of the vaporizing element to all cases that can be presented.

The device can possibly be equipped with a low-voltage electric heating cord wound about the vaporizing tube 11.

The assembly is advantageously completed by safety devices commonly used in these types of embodiments, such as a valve for stopping the liquid gas at the intake of the vaporizing element 1, or a system for regulating the flow rate of the heating fluid 10, these devices being controlled by pressure or temperature sensors.

Due to its simplicity, its ease of mounting and its low production cost, the device that has just been described lends itself particularly well to making systems for steam-pressure regulators of liquefied petroleum gas that can be adapted indifferently to all types of engines. FIG. 6 schematically illustrates an engine coupled to the regulating element Consequently, the invention is not limited to the one form of embodiment of this device for vaporizing liquefied gas described hereinabove by way of example; instead, it encompasses all of the variants of embodiment and application that conform to the same principles.

The positioning of the various constitutive elements gives the invention a maximum of useful effects that until now had not been obtained by similar devices.

I claim:

1. An arrangement for expanding liquefied gas, the arrangement comprising:
    a vaporizing element comprising a heat exchanger;
    the heat exchanger comprising an impermeable enclosure containing a heating fluid and a vaporizing tube made of a heat conducting material through which the liquefied gas passes, wherein the vaporizing tube comprises an intake connected to a supply reservoir and an outlet supplying vaporized gas;
    an element regulating a flow rate and a pressure of the vaporized gas;
    the flow rate and the pressure of the vaporized gas being regulated within a housing of the element; and
    a tube connecting the vaporizing tube to the element for regulating a flow rate and a pressure of vaporized gas,
    wherein the element for regulating a flow rate and a pressure of the vaporized gas is connected to an engine, and
    wherein the housing comprises a bottom, a cover and an intake, a flexible membrane arranged between the bottom and the cover, and a valve coupled to the intake.

2. The arrangement of claim 1, wherein the valve comprises a decelerating valve.

3. An arrangement for expanding liquefied gas, the arrangement comprising:
    a vaporizing element comprising a heat exchanger;
    the heat exchanger comprising an impermeable enclosure containing a heating fluid and a vaporizing tube made of a heat conducting material through which the liquefied gas passes, wherein the vaporizing tube comprises an intake connected to a supply reservoir and an outlet supplying vaporized gas;
    an element regulating a flow rate and a pressure of the vaporized gas;
    the flow rate and the pressure of the vaporized gas being regulated within a housing of the element; and
    a tube connecting the vaporizing tube to the element for regulating a flow rate and a pressure of vaporized gas,
    wherein the element for regulating a flow rate and a pressure of the vaporized gas is connected to an engine, and
    wherein the impermeable enclosure comprises a reinforced rubber tube having two ends, and angled connectors arranged on each of the two ends.

4. The arrangement of claim 3, wherein the vaporizing tube passes through each of the angled connectors.

5. An arrangement for expanding liquefied gas, the arrangement comprising:
    a vaporizing element comprising a heat exchanger;
    the heat exchanger comprising an impermeable enclosure containing a heating fluid and a vaporizing tube made of a heat conducting material through which the liquefied gas passes, wherein the vaporizing tube comprises an intake connected to a supply reservoir and an outlet supplying vaporized gas;
    an element regulating a flow rate and a pressure of the vaporized gas;
    the flow rate and the pressure of the vaporized gas being regulated within a housing of the element;
    a tube connecting the vaporizing tube to the element for regulating a flow rate and a pressure of vaporized gas; and
    a low-voltage electric heating cord wound about the vaporizing tube,
    wherein the element for regulating a flow rate and a pressure of the vaporized gas is connected to an engine.

6. An arrangement for expanding liquefied gas, the arrangement comprising:
    a vaporizing element comprising a heat exchanger;
    the heat exchanger comprising an impermeable enclosure containing a heating fluid and a vaporizing tube made of a heat conducting material through which the liquefied gas passes, wherein the vaporizing tube comprises an intake connected to a supply reservoir and an outlet supplying vaporized gas;
    an element regulating a flow rate and a pressure of the vaporized gas;
    the flow rate and the pressure of the vaporized gas being regulated within a housing of the element; and
    a tube connecting the vaporizing tube to the element for regulating a flow rate and a pressure of vaporized gas,
    wherein the element for regulating a flow rate and a pressure of the vaporized gas is connected to an engine, and
    wherein the vaporizing element further comprises a valve for stopping the liquefied gas.

7. The arrangement of claim 6, wherein the valve is arranged at the intake.

8. The arrangement of claim 6, wherein the valve is controlled by a pressure sensor.

9. An arrangement for expanding liquefied gas, the arrangement comprising:
    a vaporizing element comprising a heat exchanger;
    the heat exchanger comprising an impermeable enclosure containing a heating fluid and a vaporizing tube made of a heat conducting material through which the liquefied gas passes, wherein the vaporizing tube comprises an intake connected to a supply reservoir and an outlet supplying vaporized gas;
    an element regulating a flow rate and a pressure of the vaporized gas;
    the flow rate and the pressure of the vaporized gas being regulated within a housing of the element;

a tube connecting the vaporizing tube to the element for regulating a flow rate and a pressure of vaporized gas; and a system for controlling a flow rate of the heating fluid, wherein the element for regulating a flow rate and a pressure of the vaporized gas is connected to an engine.

10. An arrangement for expanding liquefied gas, the arrangement comprising:

a vaporizing element comprising a heat exchanger;

the heat exchanger comprising an impermeable enclosure containing a heating fluid and a vaporizing tube made of a heat conducting material through which the liquefied gas passes, wherein the vaporizing tube comprises an intake connected to a supply reservoir and an outlet supplying vaporized gas;

an element regulating a flow rate and a pressure of the vaporized gas;

the flow rate and the pressure of the vaporized gas being regulated within a housing of the element; and a tube connecting the vaporizing tube to the element for regulating a flow rate and a pressure of vaporized gas, wherein the element for regulating a flow rate and a pressure of the vaporized gas is connected to an engine, and wherein the vaporizing element comprises a system for controlling a flow rate of the heating fluid.

11. The arrangement of claim 10, wherein the system is controlled by a temperature sensor.

12. A system for supplying vaporized LPG to a boat engine, the system comprising:

a heat exchanger comprising an impermeable enclosure containing a heating fluid and a vaporizing tube made of a heat conducting material through which the LPG passes, wherein the vaporizing tube comprises an intake connected to a supply reservoir and an outlet supplying vaporized LPG;

a regulating device regulating a flow rate and a pressure of the vaporized LPG;

the regulating device comprising a housing having an intake and an outlet, the housing containing therein a flexible membrane engaged between a bottom portion of the housing and a cover portion of the housing and a valve located at the intake; and a tube connecting the outlet of the vaporizing tube to the intake of the regulating device, wherein the regulating device is connected to the boat engine.

13. A method of supplying vaporized liquefied petroleum gas (LPG) to a boat engine using the system of claim 12, the method comprising:

moving the heating fluid though the heat exchanger;

moving the LPG from the supply reservoir to the intake and through the vaporizing tube;

heating the LPG within the vaporizing tube with the heating fluid such that the vaporized LPG is created within the vaporizing tube;

moving the vaporized LPG through the tube connecting the outlet of the vaporizing tube to the regulating device;

regulating the flow rate and the pressure of the vaporized LPG; and supplying the vaporized LPG to the boat engine.

14. An arrangement for expanding liquefied gas, the arrangement comprising:

a vaporizing element comprising a heat exchanger;

the heat exchanger comprising an impermeable enclosure containing a heating fluid and a vaporizing tube made of a heat conducting material through which the liquefied gas passes, wherein the vaporizing tube comprises an intake connected to a supply reservoir and an outlet supplying vaporized gas;

an element regulating a flow rate and a pressure of the vaporized gas;

the flow rate and the pressure of the vaporized gas being regulated within a housing of the element; and a tube connecting the vaporizing tube to the element for regulating a flow rate and a pressure of vaporized gas, wherein the element for regulating a flow rate and a pressure of the vaporized gas is connected to an engine, and wherein the housing comprises an intake and an outlet and containing therein a valve arranged at the intake and a flexible membrane engaged between a bottom portion of the housing and a cover portion of the housing.

15. A system for delivering vaporized LPG to an engine, the system comprising:

a heat exchanger comprising an impermeable enclosure containing a heating fluid and a vaporizing tube made of a heat conducting material through which the LPG passes, wherein the vaporizing tube comprises an intake connected to a supply reservoir and an outlet supplying vaporized LPG;

a regulating device regulating a flow rate and a pressure of the vaporized LPG;

the flow rate and the pressure of the vaporized LPG being regulated within a housing of the regulating device; and a tube connecting the outlet of the vaporizing tube to the regulating device, wherein the regulating device is connected to the engine, and wherein the housing comprises an intake and an outlet and containing therein and a valve arranged at the intake and a flexible membrane having a peripheral portion that is engaged between a bottom portion of the housing and a cover portion of the housing.

* * * * *